United States Patent
He

(10) Patent No.: US 9,497,625 B2
(45) Date of Patent: *Nov. 15, 2016

(54) METHOD FOR NEGOTIATING SECURITY CAPABILITY WHEN TERMINAL MOVES

(71) Applicant: HUAWEI TECHNOLOGIES CO., LTD., Shenzhen, Guangdong (CN)

(72) Inventor: Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,338

(22) Filed: Dec. 2, 2015

(65) Prior Publication Data

US 2016/0088472 A1    Mar. 24, 2016

Related U.S. Application Data

(63) Continuation of application No. 14/873,504, filed on Oct. 2, 2015, which is a continuation of application (Continued)

(30) Foreign Application Priority Data

Aug. 31, 2007 (CN) .......................... 2007 1 0145703
Sep. 26, 2007 (CN) .......................... 2007 1 0151700

(51) Int. Cl.
*H04L 29/06* (2006.01)
*H04W 12/04* (2009.01)
(Continued)

(52) U.S. Cl.
CPC .............. *H04W 12/04* (2013.01); *H04L 9/088* (2013.01); *H04L 9/0844* (2013.01);
(Continued)

(58) Field of Classification Search
None
See application file for complete search history.

(56) References Cited

U.S. PATENT DOCUMENTS 6,028,933 A * 2/2000 Heer ...................... H04L 63/04
                                                            380/212
7,190,793 B2 * 3/2007 Hsu ...................... H04L 9/0844
                                                            380/270
(Continued)

FOREIGN PATENT DOCUMENTS

CN        1455556 A      11/2003
CN        1589060 A       3/2005
(Continued)

OTHER PUBLICATIONS

Udugama, Asanga; Kuladinithi, Koojana; Gorg, Carmelita; Pittmann, Frank, Tionardi, Laurensius. NetCAPE: Enabling Seamless IMS Service Delivery across Heterogeneous Mobile Networks. IEEE Communications Magazine. vol. 45, Issue: 7. Pub. Date: 2007. http://ieeexplore.ieee.org/stamp/stamp.jsp?tp=&arnumber=4268288.*

(Continued)

*Primary Examiner* — Jeremiah Avery
(74) *Attorney, Agent, or Firm* — Huawei Technologies Co., Ltd.

(57) ABSTRACT

Methods of security negotiation for idle state mobility from a first network to a long term evolution (LTE) network are disclosed. In one embodiment, a service general packet radio service (GPRS) support node (SGSN) of the first network transmits an authentication vector-related key to a mobility management entity (MME). A user equipment (UE) sends its security capabilities including non-access stratum (NAS) security capabilities to the MME. The MME selects a NAS security algorithm, in accordance with the NAS security capabilities of the UE, and sends a message that indicates the selected NAS security algorithm to the UE. The MME also derives, in accordance with the selected NAS security algorithm, a NAS protection key from an authentication vector-related key so as to security communication between the UE and the LTE network.

20 Claims, 4 Drawing Sheets

Related U.S. Application Data

No. 14/303,146, filed on Jun. 12, 2014, now Pat. No. 9,241,261, which is a continuation of application No. 14/147,179, filed on Jan. 3, 2014, now Pat. No. 8,812,848, which is a continuation of application No. 12/633,948, filed on Dec. 9, 2009, now Pat. No. 8,656,169, which is a continuation of application No. PCT/CN2008/072165, filed on Aug. 27, 2008.

(51) Int. Cl.
| | | |
|---|---|---|
| *H04W 12/06* | (2009.01) | |
| *H04L 9/08* | (2006.01) | |
| *H04W 36/00* | (2009.01) | |
| *H04W 12/10* | (2009.01) | |
| *H04W 12/12* | (2009.01) | |

(52) U.S. Cl.
CPC ......... *H04L 63/0492* (2013.01); *H04L 63/062* (2013.01); *H04L 63/0876* (2013.01); *H04L 63/1441* (2013.01); *H04L 63/20* (2013.01); *H04L 63/205* (2013.01); *H04L 69/24* (2013.01); *H04W 12/06* (2013.01); *H04W 12/10* (2013.01); *H04W 36/0038* (2013.01); *H04L 2463/061* (2013.01); *H04W 12/12* (2013.01)

(56) References Cited

U.S. PATENT DOCUMENTS

| | | | |
|---|---|---|---|
| 7,310,307 B1* | 12/2007 | Das | H04L 12/66 370/229 |
| 7,929,703 B2* | 4/2011 | Bellows | H04L 41/28 380/270 |
| 7,962,122 B2 | 6/2011 | Nikander et al. | |
| 8,027,304 B2 | 9/2011 | Forsberg | |
| 8,078,753 B2 | 12/2011 | Bachmann et al. | |
| 8,107,433 B2* | 1/2012 | Jokinen | H04W 36/0033 370/254 |
| 8,117,454 B2 | 2/2012 | Forsberg | |
| 8,165,054 B2 | 4/2012 | Becker et al. | |
| 8,170,566 B2 | 5/2012 | Pudney | |
| 8,213,903 B2 | 7/2012 | Pudney et al. | |
| 8,462,742 B2 | 6/2013 | Song et al. | |
| 8,515,462 B2 | 8/2013 | Courau et al. | |
| 8,627,092 B2 | 1/2014 | Fischer et al. | |
| 2002/0052200 A1 | 5/2002 | Arkko et al. | |
| 2002/0066011 A1 | 5/2002 | Vialen et al. | |
| 2002/0071558 A1 | 6/2002 | Patel | |
| 2003/0139180 A1 | 7/2003 | McIntosh et al. | |
| 2006/0182280 A1 | 8/2006 | Laitinen et al. | |
| 2007/0041360 A1 | 2/2007 | Gallagher et al. | |
| 2007/0086591 A1 | 4/2007 | Blom et al. | |
| 2007/0117575 A1 | 5/2007 | Courau et al. | |
| 2007/0210894 A1 | 9/2007 | Park et al. | |
| 2007/0218903 A1* | 9/2007 | Grech | H04W 36/02 455/436 |
| 2007/0224993 A1* | 9/2007 | Forsberg | H04L 9/0844 455/436 |
| 2007/0249352 A1 | 10/2007 | Song et al. | |
| 2007/0271458 A1* | 11/2007 | Bosch | H04L 63/0853 713/168 |
| 2007/0297367 A1 | 12/2007 | Wang et al. | |
| 2008/0020745 A1 | 1/2008 | Bae et al. | |
| 2008/0025263 A1 | 1/2008 | Pelkonen | |
| 2008/0031159 A1 | 2/2008 | Jokinen | |
| 2008/0102896 A1 | 5/2008 | Wang et al. | |
| 2008/0184032 A1 | 7/2008 | Li et al. | |
| 2008/0188200 A1 | 8/2008 | Forsberg | |
| 2008/0207168 A1 | 8/2008 | Forsberg | |
| 2008/0301434 A1 | 12/2008 | Haddad et al. | |
| 2009/0025060 A1 | 1/2009 | Mukherjee et al. | |
| 2009/0067628 A1 | 3/2009 | Pudney et al. | |
| 2009/0221306 A1 | 9/2009 | Jacobsohn et al. | |
| 2009/0275309 A1 | 11/2009 | He | |
| 2010/0235634 A1 | 9/2010 | Fischer | |
| 2014/0169563 A1 | 6/2014 | Yan | |

FOREIGN PATENT DOCUMENTS

| | | |
|---|---|---|
| CN | 1710985 A | 12/2005 |
| CN | 1795656 A | 6/2006 |
| CN | 1801698 A | 7/2006 |
| CN | 1937487 A | 3/2007 |
| CN | 1953374 A | 4/2007 |
| CN | 1983921 A | 6/2007 |
| CN | 101242630 A | 8/2008 |
| CN | 101309500 A | 11/2008 |
| EP | 1282321 B1 | 2/2005 |
| EP | 2214444 A1 | 8/2010 |
| JP | 2009531952 A | 9/2009 |
| JP | 2009540721 A | 11/2009 |
| JP | 2010521905 A | 6/2010 |
| JP | 2010528559 A | 8/2010 |
| RU | 2174924 C1 | 10/2001 |
| WO | 2007078159 A1 | 7/2007 |

OTHER PUBLICATIONS

Kueh, Victor Y.H.; Wilson, Mick. Application of Context Transfer for Roaming in IP-Based Evolved 3G Networks. 2006 IEEE 17th International Symposium on Personal, Indoor and Mobile Radio Communications. http://ieeexplore.ieee.org/stamp/stamp.jsp?tp=&arnumber=4022315.*

3GPP TS 23A01 V1.1.0,3rd Generation Partnership Project;Technical Specification Group Services and System Aspects;GPRS enhancements for E-UTRAN access(Release 8),Jul. 2007,total 77 pages.

3GPP TR 23.882 V1.11.0,3rd Generation Partnership Project; Technical Specification Group Services and System Aspects;3GPP System Architecture Evolution:Report on Technical Options and Conclusions(Release 7),Jul. 2007, total 211 pages.

3GPP TR 33.821 V0.4.0,3rd Generation Partnership Project;Technical Specification Group Services and System Aspects;Rationale and track of security decisions in Long Term Evolved (LTE) RAN / 3GPP System Architecture Evolution(SAE) (Release 8),Jul. 2007,total 88 pages.

3GPP TSG SA WG3 Security S3#48 S3-070529,"Pseudo-CR to TR 33.821: Key handling on idle mode mobility",Nokia Siemens Networks, Nokia, Jul. 10-13, 2007,total 4 pages.

3GPP TSG SA WG3 Security S3#49 S3-070685,"Key handling on idle mode mobility from UTRAN to E-UTRAN", Huawei,Oct. 8-12, 2007,total 2 pages.

3GPP TR 33.821 V0.2.0,3rd Generation Partnership Project;Technical Specification Group Services and System Aspects;Rationale and track of security decisions in Long Term Evolved (LTE) RAN / 3GPP System Architecture Evolution(SAE) (Release 8),Apr. 2007,total 78 pages.

3GPP TSG SA WG3 Security—SA3#46 S3-070100,"Security algorithm negotiation in SAE/LTE networks",Nokia, Siemens Networks,Feb. 13-16, 2007,total 11 pages.

3GPP TSG SA WG3 Security—S3#48 S3-070529,"Pseudo-CR to TR 33.821: Key handling on idle mode mobility", Nokia Siemens Networks, Nokia, Jul. 10-13, 2007,total 3 pages.

3GPP TSG SA WG3 Security—SA3#48 S3-070522,"Update on algorithms selection",Nokia et al.,Jul. 10-13, 2007,total 6 pages.

3GPP TSG SA WG3 Security—S3#47 S3-070366,"Key conversion and key transfer for inter-RAT handover",Huawei, May 22-25, 2007,total 2 pages.

3GPP TSG SA WG3 Security—S3#47 S3-070365,"Pseudo-Change to TR 33.821: Update of section 7.4.13.4.4 Algorithms selection on handover to and from 2G/3G",Huawei, May 22-25, 2007,total 2 pages.

3GPP TSG SA WG2 Meeting #59 S2-073568,"Establishment of NAS security",Nokia Siemens Networks, Nokia, Aug. 27-31, 2007,total 8 pages.

(56) References Cited

OTHER PUBLICATIONS

TSG-RAN Working Group 3 meeting #7 TSGR3#7(99)B55,"Security Mode Control Procedure for RANAP",Ericsson, Sep. 20-24, 1999, total 8 pages.
3GPP TR 33.821 V0.3.0,3rd Generation Partnership Project;Technical Specification Group Services and System Aspects;Rationale and track of security decisions in Long Term Evolved (LTE) RAN / 3GPP System Architecture Evolution(SAE) (Release 8),May 2007,total 84 pages.
Chan Yeob Yeum,"Security for Emerging Ubiquitous Networks",IEEE 62nd Vehicular Technology Conference. vol. 2. Pub. 2005 ,total 7 pages.
A.R. Prasad et al.,"An Evolutionary Approach towards Ubiquitous Communications: A Security Perspective", Computer Society, 0-7695-2050-2/04 $20.00 © 2004 IEEE,total 7 pages.
S. Sargento et al.,"Ubiquitous Access through the Integration of Mobile Ad-hoc Networks",16th IST Mobile and Wireless Communications Summit,2007,total 6 pages.
Kyung-Ho Kim et al.,"Key Technologies for the Next Generation Wireless Communications", Proceedings of the 4th International Conference Hardware/Software Codesign and System Synthesis,2006,total 4 pages.
Rajavelsamy R et al.,"A Novel Method for Authentication Optimization during Handover in Heterogenous Wireless Networks",2nd International Conference on Communication Systems Software and Middleware,2007,total 5 pages.
Victor Y.H. Kueh et al.,"Application of Context Transfer for Roaming in IP-Based Evolved 3G Networks",2006 IEEE 17th International Symposium on Personal, Indoor and Mobile Radio Communications,total 5 pages.
Tsunehiko Chiba et al.,"Mobility Management Schemes for Heterogeneity Support in Next Generation Wireless Networks", 3rd EuroNGI Conference on Next Generation Internet Networks, 2007, total 8 pages.
Vinod Cherian Joseph et al.,"Verifiable AKA for Beyond 3G Wireless Packet Services",3rd EuroNGI Conference on Next Generation Internet works, 2006, total 5 pages.
3GPP TS 23.401 V1.1.0(23401-111), 3rd Generation Partnership Project; Technical Specification Group Services and System Aspects; GPRS enhancements for E-UTRAN access(Release 8), Jul. 2007, total 78 pages.
3GPP TS 24.008 V7.8.0, 3rd Generation Partnership Project; Technical Specification Group Core Network and Terminals; Mobile radio interface Layer 3 specification; Core network protocols; Stage 3(Release 7), Jun. 2007, total 547 pages.
Patrick Horster, "Communications and Multimedia Security 2",Published by Chapman & Hall on behalf of the International Federation for information Processing(IFIP), Sep. 23-24, 1996, total 19 pages.
TSG-RAN Working Group 3 meeting #7 TSGR3#7(99)D49,"Proposed liaison statement to SA3,CN1,RAN2", Ericsson, Sep. 20-24, 1999, total 9 pages.
Steve Burnett and Stephen Paine, "RSA Security's Office Guide to Cryptography", Osborne/McGraw-Hill, 2001, total 44 pages.
3GPP TSG SA WG3 Security-SA#46b S3-070232,"Pseudo-Change Request to TR 33.821: Update of sections 7.4.11 and 7.4.12 on active and idle mode mobility of user-related keys in SAE/LTE", Nokia, Simens Networks, Mar. 28-29, 2007, total 6 pages.
3GPP TSG SA WG2 Architecture-S2#56c Rel-8 Ad-hoc S2-071124,"Attach signalling flows", Huawei, Mar. 26-30, 2007, total 5 pages.
3GPP TSG SA WG2 Architecture-S2 Rel-8 Ad-hoc S2-071399,"Tracking Area Update with CN Node Change", Nokia, Simens Networks, Mar. 26-30, 2007, total 7 pages.
3GPP TSG SA WG2 Architecture—S2#58 S2-072966,"Tracking Area Update GERAN—E-UTRAN", Ericsson, Jun. 25-29, 2007, total 6 pages.
3GPP TSG SA WG2 Architecture—S2#58 S2-072967,"Tracking Area Update UMTS—E-UTRAN", Ericsson, Jun. 25-29, 2007, total 7 pages.
3GPP TSG SA WG2 Architecture—S2#58 52-073102(e-mail revision 5 of S2-072966),"Tracking Area Update GERAN—E-UTRAN", Jun. 25-29, 2007, total 6 pages.
3GPP TSG SA WG2 Architecture—S2#58 S2-073103(e-mail revision 1 of S2-072967),"Tracking Area Update UMTS—E-UTRAN", Ericsson, Jun. 25-29, 2007, total 7 pages.
3GPP TSG SA WG3 Security—SA3#47 S3-070304,"Key handling on idle mode mobility",Nokia Siemens Networks, Nokia, May 22-25, 2007, total 2 pages.
Marwick Ford et al., "Secure Electronic Commerce Building the Infrastructure for Digital Signatures and Encryption", Second Edition, Prentice Hall PTR, 2001, total 19 pages.
3GPP TS 23.060 V7.4.0, 3rd Generation Partnership Project; Technical Specification Group Services and System Aspects; General Packet Radio Service (GPRS); Service description; Stage 2(Release 7), Mar. 2007, total 229 pages.
3GPP TS 23.401 V1.01.0, 3rd Generation Partnership Project; Technical Specification Group Services and System Aspects; GPRS enhancements for E-UTRAN access(Release 8), Jul. 2007, total 102 pages.
3GPP TS 23.401 V13.2.0, 3rd Generation Partnership Project; Technical Specification Group Services and System Aspects; General Packet Radio Service (GPRS) enhancements for Evolved Universal Terrestrial Radio Access Network (E-UTRAN) access(Release 13),Mar. 2015, total 331 pages.
3GPP TS 25.304 V3.14.0, 3rd Generation Partnership Project; Technical Specification Group Radio Access Network; User Equipment (UE) procedures in idle mode and procedures for cell reselection in connected mode(Release 1999), Mar. 2004, total 41 pages.
3GPP TS 29.060 V8.0.0, 3rd Generation Partnership Project; Technical Specification Group Core Network and Terminals; General Packet Radio Service (GPRS); GPRS Tunnelling Protocol (GTP) across the Gn and Gp interface (Release 8), Jun. 2007, total 150 pages.
3GPP TS 33.102 V7.1.0, 3rd Generation Partnership Project; Technical Specification Group Services and System Aspects; 3G Security; Security architecture(Release 7), Dec. 2006, total 70 pages.
Heikki Kaaranen et al.,"UMTS Networks", Architecture, Mobility and Services, Second Edition, John Wiley & Sons, Ltd, 2005, total 413 pages.
Valtteri Niemi and Kaisa Nyberg,"Universal Mobile Telecommunications System(UMTS) Security", John Wiley & Sons, Ltd, 2003, total 57 pages.

\* cited by examiner

METHOD FOR NEGOTIATING SECURITY CAPABILITY WHEN TERMINAL MOVES

This application is a continuation of U.S. patent application Ser. No. 14/873,504, filed on Oct. 2, 2015, which is a continuation of U.S. patent application Ser. No. 14/303,146, filed on Jun. 12, 2014, which is a continuation of U.S. patent application Ser. No. 14/147,179, filed on Jan. 3, 2014, now U.S. Pat. No. 8,812,848, which is a continuation of U.S. patent application Ser. No. 12/633,948, filed on Dec. 9, 2009, now U.S. Pat. No. 8,656,169, which is a continuation of International Application No. PCT/CN2008/072165, filed on Aug. 27, 2008, which claims priorities of Chinese Patent Application No. 200710145703.3, filed on Aug. 31, 2007 and Chinese Patent Application No. 200710151700.0, filed on Sep. 26, 2007, all of which are hereby incorporated by reference in their entireties.

TECHNICAL FIELD

The present disclosure relates to the field of wireless communication technology, and more particularly to a method for negotiating a security capability when a terminal moves.

BACKGROUND

A wireless network includes a radio access network and a core network. A core network of a long term evolution (LTE) wireless network includes an MME. The MME has functions similar to those of a service general packet radio service (GPRS) support node (SGSN) of a second/third generation (2G/3G) network, and is mainly responsible for mobility management and user authentication. When a UE is in an idle state in a 2G/3G or LTE wireless network, the UE needs to respectively negotiate a non-access stratum (NAS) security capability with the SGSN or the MME. The security capability includes an NAS signaling encryption algorithm, a corresponding NAS integrity protection key Knas-int, an NAS integrity protection algorithm, and a corresponding NAS confidentiality protection key Knas-enc, which are used for signaling transmission between the UE and a system, thereby ensuring the normal receiving of the UE signaling and the security of the communication system.

When the UE accessing a 2G global system for mobile communications (GSM) edge radio access network (GERAN) or a 3G universal mobile telecommunications system (UMTS) terrestrial radio access network (UTRAN) moves in the idle state, the UE may move to a tracking area of an LTE radio access network, and thus the UE may access the network again through the LTE. At this time, a tracking area update (TAU) procedure occurs, that is, a TAU procedure between heterogeneous networks occurs. During the procedure, since the entity performing security capability negotiation for the UE changes, for example, from the SGSN to the MME, and the entities may have different security capabilities, the security capability negotiation procedure needs to be performed again, so as to ensure the security of subsequent interaction between the UE and the network. It should be noted that, for the LTE network, the security capability negotiation includes negotiation of an NAS confidentiality protection algorithm and an NAS integrity protection algorithm, a radio resource control (RRC) confidentiality protection algorithm and an RRC integrity protection algorithm, and a user plane (UP) confidentiality protection algorithm.

For the TAU procedure initiated by the UE in the idle state, the negotiation of the NAS confidentiality protection algorithm, the NAS integrity protection algorithm, and the corresponding NAS protection keys need to be solved.

During the implementation of the present disclosure, the inventor found that, no method for negotiating the security capability during the TAU procedure between the heterogeneous networks can be found in the prior art, so that when the UE moves from the 2G/3G network to the LTE network, the security capability negotiation cannot be performed, resulting in that the security of subsequent interaction between the UE and the network cannot be ensured.

SUMMARY OF THE DISCLOSURE

In one embodiment of the present disclosure, a method of security negotiation for idle state mobility from a first network to a long term evolution (LTE) network is disclosed. This method includes transmitting an authentication vector-related key from a service general packet radio service (GPRS) support node (SGSN) of the first network to a mobility management entity (MME) included in the LTE network, receiving by the MME security capabilities of a user equipment (UE) including non-access stratum (NAS) security capabilities of the UE from the UE. In addition, this method further includes selecting by the MME a NAS security algorithm supported by the NAS security capabilities of the UE, sending by the MME a message that indicates the selected NAS security algorithm to the UE, and deriving by the MME a NAS protection key with the selected NAS security algorithm from the authentication vector-related key.

In another embodiment of the present disclosure, a method of security negotiation for idle state mobility from a first network to a long term evolution (LTE) network is disclosed. This method includes transmitting an authentication vector-related key from a service general packet radio service (GPRS) support node (SGSN) in the first network to a mobility management entity (MME). In addition, this method includes receiving security capabilities of a user equipment (UE) including non-access stratum (NAS) security capabilities of the UE from the UE, selecting a NAS security algorithm supported by the NAS security capabilities of the UE, sending a message that indicates the selected NAS security algorithm to the UE, and deriving a NAS protection key with the selected NAS security algorithm from the authentication vector-related key.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

DETAILED DESCRIPTION OF ILLUSTRATIVE EMBODIMENTS

In a method for negotiating a security capability when a terminal moves provided in the embodiments of the present disclosure, when a UE moves from a 2G/3G network to an LTE network, an MME receives a TAU request message sent from the UE, and acquires an NAS security algorithm supported by the UE, and an authentication vector-related key or a root key derived according to the authentication vector-related key. Then, the MME selects an NAS security algorithm according to the NAS security algorithm supported by the UE, derives an NAS protection key according to the authentication vector-related key or the root key derived according to the authentication vector-related key, and sends a message carrying the selected NAS security algorithm to the UE. The UE derives an NAS protection key according to an authentication vector-related key.

The embodiments of the present disclosure are illustrated in detail below with reference to specific embodiments and the accompanying drawings.

It is assumed that a UE has accessed a UTRAN/GERAN when being in an idle state. In this case, when moving to a tracking area of an LTE network, the UE initiates a TAU procedure.

Figure 1:
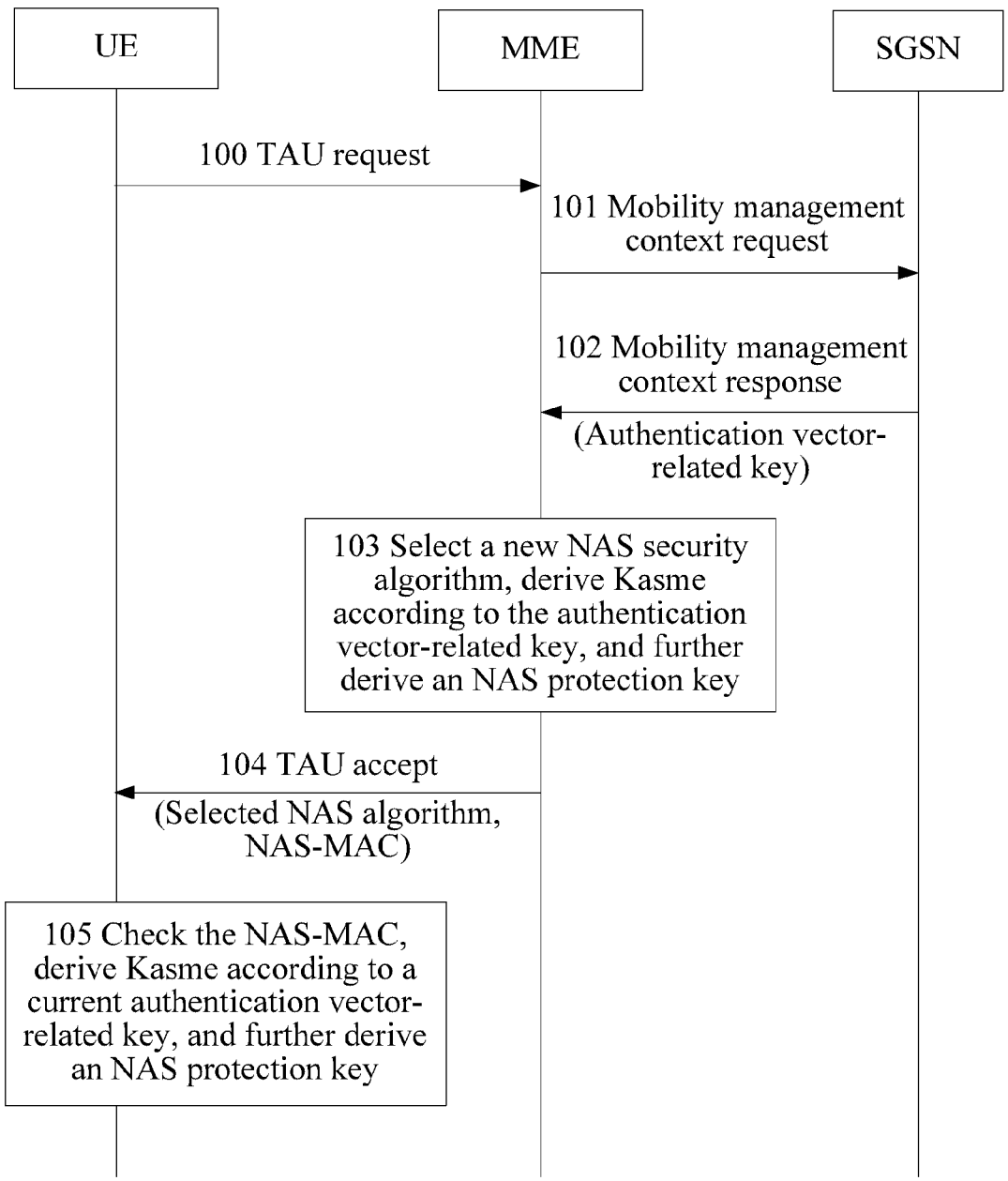
FIG. 1 is a flow chart of a method, according to a first embodiment of the present disclosure, for negotiating a security capability when a terminal moves.

FIG. 1 is a flow chart of a method, according to a first embodiment of the present disclosure, for negotiating a security capability when a terminal moves. Referring to FIG. 1, the method includes the following steps.

In step 100, a UE sends a TAU request to an MME.

In this step, the UE sends the TAU request to a new MME through an evolved Node B (eNB) of an LTE radio access network. For the convenience of description, communication between the UE and the MME through the eNB is simplified to communication between the UE and the MME in the following description.

The TAU request sent from the UE to the MME in this step not only carries some parameters such as a temporary mobile subscriber identity (TMSI) known to persons skilled in the art, but may also carry security capability information supported by the UE. The security capability information includes an NAS security algorithm (an NAS integrity protection algorithm and/or an NAS confidentiality protection algorithm), and may also include an RRC security algorithm (an RRC integrity protection algorithm and/or an RRC confidentiality protection algorithm) or a UP security algorithm (a UP confidentiality protection algorithm).

In steps 101-102, the MME acquires an NAS security algorithm supported by the UE, and sends a mobility management context request message to an SGSN. After receiving the message, the SGSN sends a mobility management context response message carrying an authentication vector-related key to the MME.

If in step 100, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

When the UE moves from the 2G network to the tracking area of the LTE network, the SGSN in the above process is an SGSN of the 2G network, and the authentication vector-related key at least includes an encryption key Kc, or a value Kc' obtained after a unidirectional conversion is performed on the Kc. When the UE moves from the 3G network to the tracking area of the LTE network, the SGSN in the above process is an SGSN of the 3G network, and the authentication vector-related key at least includes an integrity key IK and an encryption key CK, or values IK' and CK' after a unidirectional conversion is performed on the IK and the CK.

The unidirectional conversion refers to a conversion procedure in which an original parameter is converted by using a certain algorithm to obtain a target parameter, but the original parameter cannot be derived according to the target parameter. For example, for the Kc, if the Kc' is obtained by using an algorithm f(Kc), but the Kc cannot be derived according to the Kc' by using any inverse algorithm, the conversion is the unidirectional conversion.

In step 103, the MME selects a new NAS security algorithm, according to the NAS security algorithm supported by the UE and an NAS security algorithm supported by the MME as well as an NAS security algorithm allowed by the system, derives a root key Kasme according to the authentication vector-related key, and then derives an NAS protection key according to the Kasme. The NAS protection key includes an NAS integrity protection key Knas-int and/or an NAS confidentiality protection key Knas-enc.

In step 104, the MME generates a TAU accept message carrying the selected NAS security algorithm.

In this step, the MME may further perform an NAS integrity protection on the TAU accept message. For example, the MME derives a value of a message authentication code of the NAS integrity protection (NAS-MAC) according to the NAS integrity protection key Knas-int derived in step 103, information in the TAU accept, and the NAS integrity protection algorithm in the selected NAS security algorithm, and then carries the value in the TAU accept message, and sends the TAU accept message to the UE.

The TAU accept message in this step may further carry security capability information supported by the UE.

In step 105, the UE receives the TAU accept message carrying the NAS security algorithm selected by the MME, and acquires the negotiated NAS security algorithm; and then derives a root key Kasme according to a current authentication vector-related key thereof (for example, the IK and the CK, or the IK' and the CK' derived according to the IK and the CK when the originating network is the 3G, or the Kc or the Kc' derived according to the Kc when the originating network is the 2G), and derives an NAS protection key according to the root key. The NAS protection key includes the NAS integrity protection key Knas-int and/or the NAS confidentiality protection key Knas-enc.

In this step, the UE may further detect whether the integrity protection performed on the TAU accept message is correct. If not, it is determined that the current security capability negotiation fails, and the security capability negotiation procedure may be initiated again. For example, the UE derives an NAS-MAC according to the derived NAS confidentiality protection key Knas-enc, the information in the TAU accept, and the NAS integrity protection algorithm carried in the TAU accept message, and then compares whether the derived NAS-MAC is the same as the NAS-MAC carried in the TAU accept message. If yes, it indicates that the message is not modified during transmission; otherwise, it is deemed that the message is modified during transmission, and it is thus determined that the current security capability negotiation fails.

If in step 104, the TAU accept message further carries the security capability information supported by the UE, in this step, the UE may further compare the security capability information supported by the UE and carried in the TAU accept message with security capability information stored therein. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

For the degradation attack, it is assumed that the UE supports two security algorithms at the same time, namely, a high strength algorithm A1 and a low strength algorithm A2, and the MME also supports the two algorithms. In this manner, the high strength algorithm A1 should be negotiated between the UE and the MME. However, if in a path along which the UE sends the security capability information supported by the UE to the MME, an attacker modifies the security capability information of the UE, for example, only the low strength algorithm A2 is maintained, or when the MME selects the NAS security algorithm, the security capability information supported by the UE is modified by the attacker, and only the low strength algorithm A2 is maintained, the MME can only select and send the low strength algorithm A2 to the UE. That is, the low strength algorithm A2, rather than the high strength algorithm A1, is obtained through the negotiation between the UE and the MME, so that the attacker may perform an attack more easily, which is the so-called degradation attack. In an embodiment of the present disclosure, the MME sends the security capability information supported by the UE to the UE, and the UE detects whether the security capability information supported by the UE is consistent with the security capability information supported by the UE, thereby detecting and further preventing the degradation attack.

The procedure that the MME finally derives the NAS protection key according to the authentication vector-related key in step 103 is not limited to any time sequence with respect to step 104 and step 105, and the procedure may be performed before step 104, or between step 104 and step 105, or after step 105.

In the above process, the MME and the UE may also directly derive the NAS protection key according to the authentication vector-related key without deriving the root key and then deriving the NAS protection key according to the root key.

It should be understood by persons skilled in the art that, in the above process, a derivation method used by the UE to derive the NAS protection key according to the authentication vector-related key must be the same as that used by the network side to derive the NAS protection key according to the authentication vector-related key. The derivation method may adopt any unidirectional conversion, for example, Kasme=f(IK, CK, other parameters), Knas-enc=f(Kasme, NAS confidentiality protection algorithm, other parameters), and Knas-int=f(Kasme, NAS integrity protection algorithm, other parameters).

In addition, in order to highlight this embodiment of the present disclosure, procedures that are not related to the security are omitted between steps 102 and 104 in the above process.

Through the above process, the UE and the MME can share the NAS security algorithm and the NAS protection key, thereby implementing the negotiation of the NAS security capability.

Figure 2:
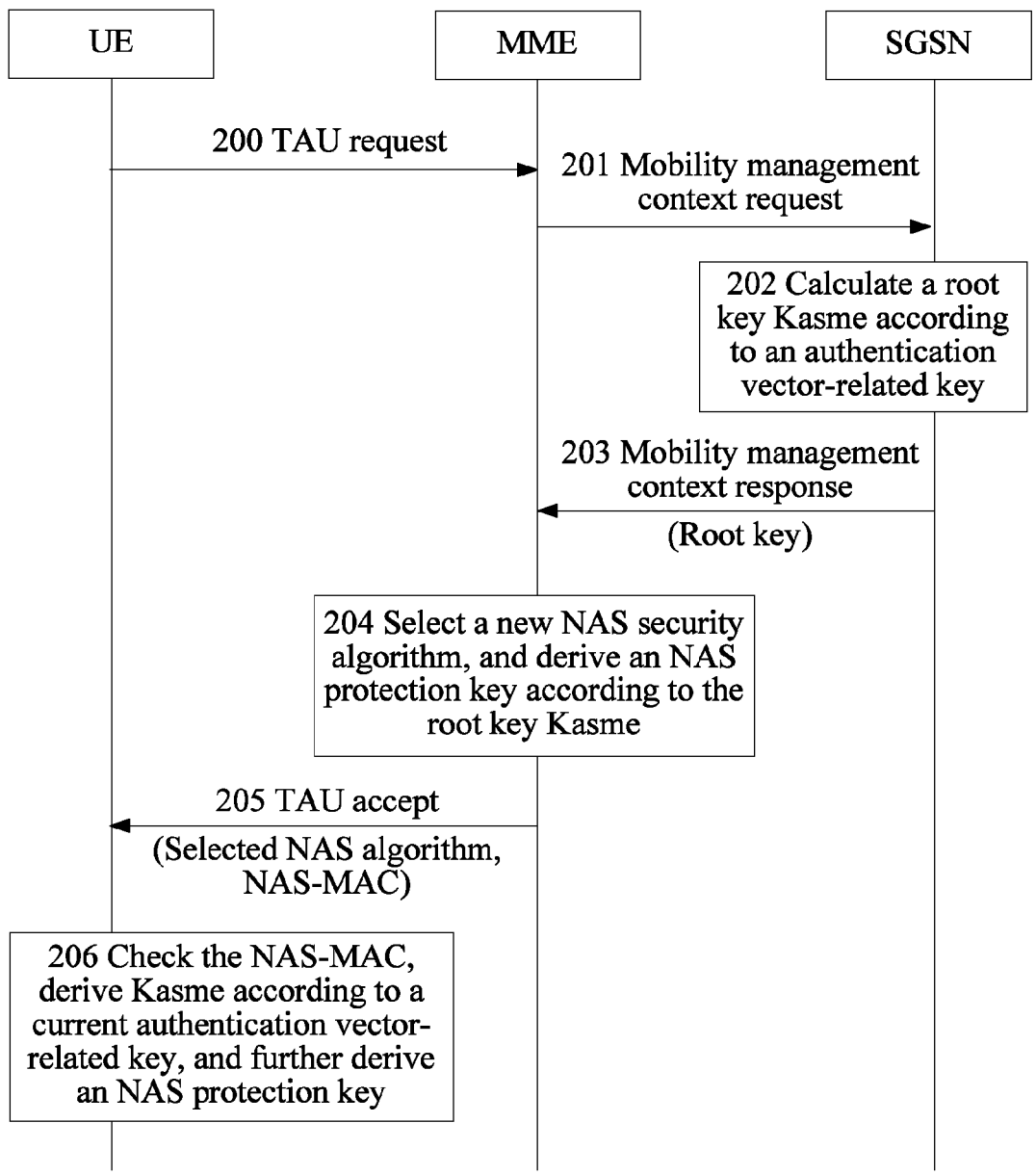
FIG. 2 is a flow chart of a method, according to a second embodiment of the present disclosure, for negotiating a security capability when a terminal moves.

FIG. 2 is a flow chart of a method, according to a second embodiment of the present disclosure, for negotiating a security capability when a terminal moves. Referring to FIG. 2, the method includes the following steps.

Step 200 is the same as step 100, so description thereof is omitted here.

In steps 201-203, the MME acquires an NAS security algorithm supported by the UE, and sends a context request message to an SGSN. After receiving the context request message, the SGSN derives a root key according to an authentication vector-related key thereof, and then sends a context response message carrying the root key to the MME.

In other embodiments of the present disclosure, if in step 200, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

When the UE moves from the 2G network to the tracking area of the LTE network, the SGSN in the above process is an SGSN of the 2G network, and the root key is the root key Kasme derived by the SGSN according to the Kc or the Kc' obtained after the unidirectional conversion is performed on the Kc. When the UE moves from the 3G network to the tracking area of the LTE network, the SGSN in the above process is an SGSN of the 3G network, and the root key is the Kasme derived by the SGSN according to the IK and the CK, or the IK' and the CK' after the unidirectional conversion is performed on the IK and the CK.

In step 204, the MME selects a new NAS security algorithm, according to the NAS security algorithm supported by the UE and an NAS security algorithm supported by the MME as well as an NAS security algorithm allowed by the system; and then derives an NAS protection key according to the root key. The NAS protection key includes an NAS integrity protection key Knas-int and/or an NAS confidentiality protection key Knas-enc.

In step 205, the MME generates a TAU accept message carrying the selected NAS security algorithm.

In this step, the MME may further perform an NAS integrity protection on the TAU accept message. The TAU accept message in this step may further carry security capability information supported by the UE.

In step 206, the UE receives the TAU accept message carrying the NAS security algorithm selected by the MME, and acquires the negotiated NAS security algorithm; and then derives a root key Kasme according to a current authentication vector-related key (for example, the IK and the CK, or the IK' and the CK' derived according to the IK and the CK when the originating network is the 3G, or the Kc or the Kc' derived according to the Kc when the originating network is the 2G), and derives an NAS protection key according to the root key. The NAS protection key includes the NAS integrity protection key Knas-int and/or the NAS confidentiality protection key Knas-enc.

In this step, the UE may further detect whether the integrity protection performed on the TAU accept message is correct. If not, it is determined that the current security capability negotiation fails, and the security capability negotiation procedure may be initiated again.

In other embodiments of the present disclosure, if in step 205, the TAU accept message further carries the security capability information supported by the UE, in this step, the UE may further compare the security capability information supported by the UE carried in the TAU accept message with security capability information supported by the UE. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

In other embodiments of the present disclosure, the procedure that the MME derives the NAS protection key according to the root key in step 204 is not limited to any time sequence with respect to step 205 and step 206, and the procedure may be performed before step 205, or between step 205 and step 206, or after step 206.

It should be understood by persons skilled in the art that, in the above process, a derivation method used by the UE to derive the NAS protection key according to the authentication vector-related key must be the same as that used by the network side to derive the NAS protection key according to the authentication vector-related key.

Through the above process, the UE and the MME can share the NAS security algorithm and the NAS protection key, thereby implementing the negotiation of the NAS security capability.

Figure 3:
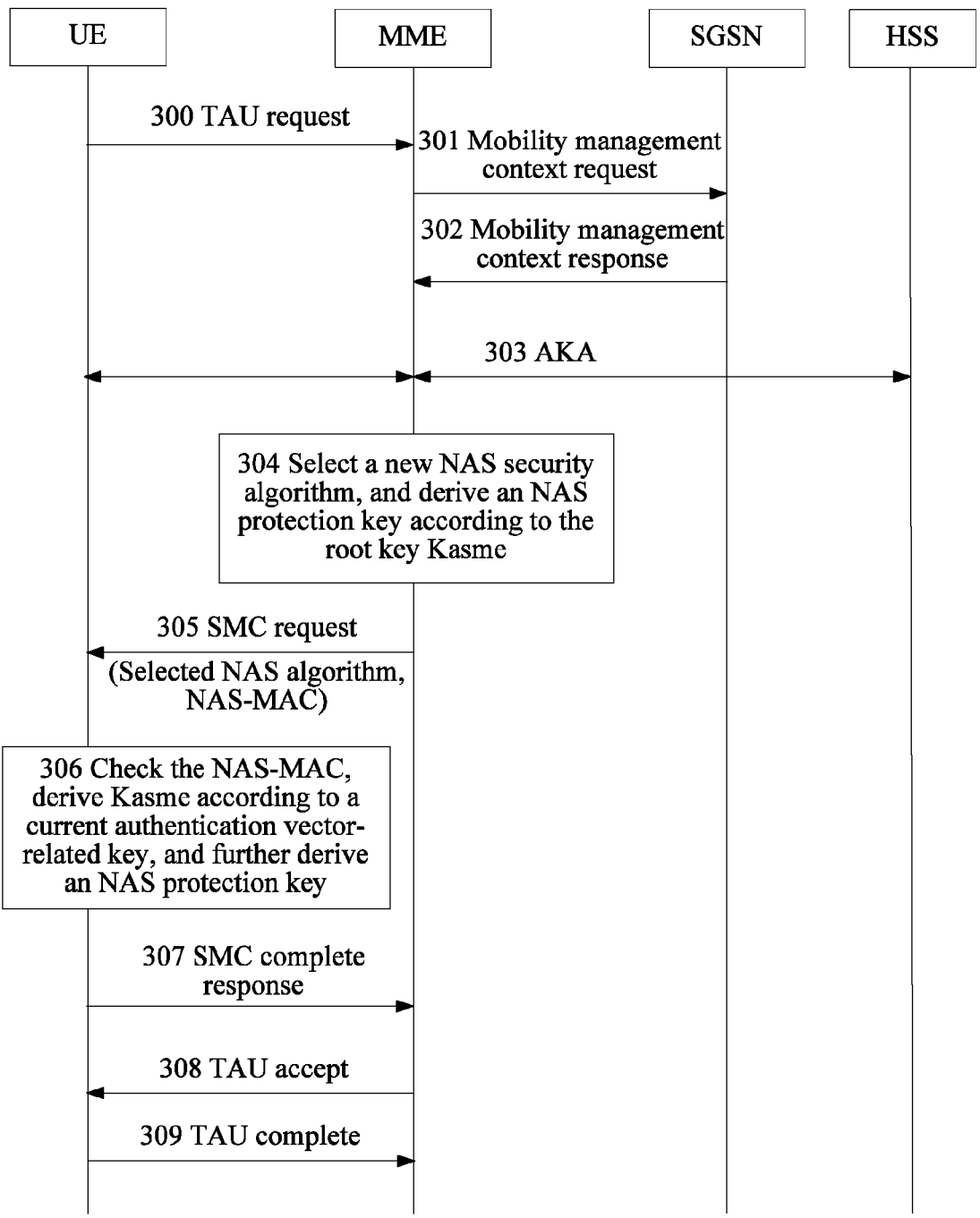
FIG. 3 is a flow chart of a method, according to a third embodiment of the present disclosure, for negotiating a security capability when a terminal moves.

FIG. 3 is a flow chart of a method, according to a third embodiment of the present disclosure, for negotiating a security capability when a terminal moves. Referring to FIG. 3, the method includes the following steps.

Step 300 is the same as step 100, so description thereof is omitted here.

In steps 301-302, the MME acquires an NAS security algorithm supported by the UE from an SGSN through mobility management context request and response messages.

In other embodiments of the present disclosure, if in step 300, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

In step 303, the MME acquires a root key Kasme derived according to an authentication vector-related key from a home subscriber server (HSS) through an authentication and key agreement (AKA) procedure.

In step 304, the MME selects a new NAS security algorithm, according to the NAS security algorithm supported by the UE and an NAS security algorithm supported by the MME as well as and an NAS security algorithm allowed by the system; and then derives other NAS protection keys according to the Kasme. The NAS protection keys include an NAS integrity protection key Knas-int and an NAS confidentiality protection key Knas-enc.

In step 305, the MME generates and sends to the UE an NAS security mode command (SMC) request message carrying the selected NAS security algorithm. The SMC request message may be carried in a TAU accept message.

In this step, the MME may further perform an NAS integrity protection on the SMC accept message. For example, the MME derives a value of an message authentication code of the NAS integrity protection (NAS-MAC) according to the NAS integrity protection key Knas-int derived in step 304, information in the SMC request message, and the NAS integrity protection algorithm in the selected NAS security algorithm, and then carries the value in the SMC request message, and sends the SMC request message to the UE.

The SMC request message in this step may further carry security capability information supported by the UE.

In step 306, the UE receives the SMC request message carrying the NAS security algorithm selected by the MME, and acquires the NAS security algorithm supported by the UE and selected by the MME; and then derives a root key according to a current authentication vector-related key obtained in an AKA procedure thereof, and derives an NAS protection key according to the root key. The NAS protection key includes the NAS integrity protection key Knas-int and the NAS confidentiality protection key Knas-enc.

In this embodiment, in this step, the UE may further detect whether the integrity protection performed on the TAU accept message is correct. If not, it is determined that the current security capability negotiation fails, and the security capability negotiation procedure may be initiated again. For example, the UE derives an NAS-MAC according to the derived NAS confidentiality protection key Knas-enc, the information in the TAU accept message, and the NAS integrity protection algorithm carried in the TAU accept message, and then compares whether the derived NAS-MAC is the same as the NAS-MAC carried in the TAU accept message. If yes, it indicates that the message is not modified during transmission; otherwise, it is deemed that the message is modified during transmission, and it is thus determined that the current security capability negotiation fails.

In other embodiments of the present disclosure, if in step 305, the SMC request message further carries the security capability information supported by the UE, in this step, the UE may further compare the security capability information supported by the UE and carried in the SMC request message with security capability information supported by the UE. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

In step 307, the UE sends an SMC complete response message to the MME. The SMC complete response message may be carried in a TAU complete message.

In step 308, the MME returns a TAU accept message.

In other embodiments of the present disclosure, when the SMC request message is sent to the UE by carrying the SMC request message in the TAU accept message in step 305, step 308 is combined with step 305.

In step 309, the UE returns a TAU complete message.

In other embodiments of the present disclosure, when the SMC complete response message is carried in the TAU complete message in step 307, step 309 is combined with step 307.

Through the above process, the negotiation of the NAS security capability is implemented.

Persons of ordinary skill in the art should understand that all or a part of the steps in the method according to the embodiments of the present disclosure may be implemented by a program instructing relevant hardware, and the program may be stored in a computer readable storage medium, such as a read-only memory (ROM)/random access memory (RAM), a magnetic disk, or an optical disk.

Figure 4:
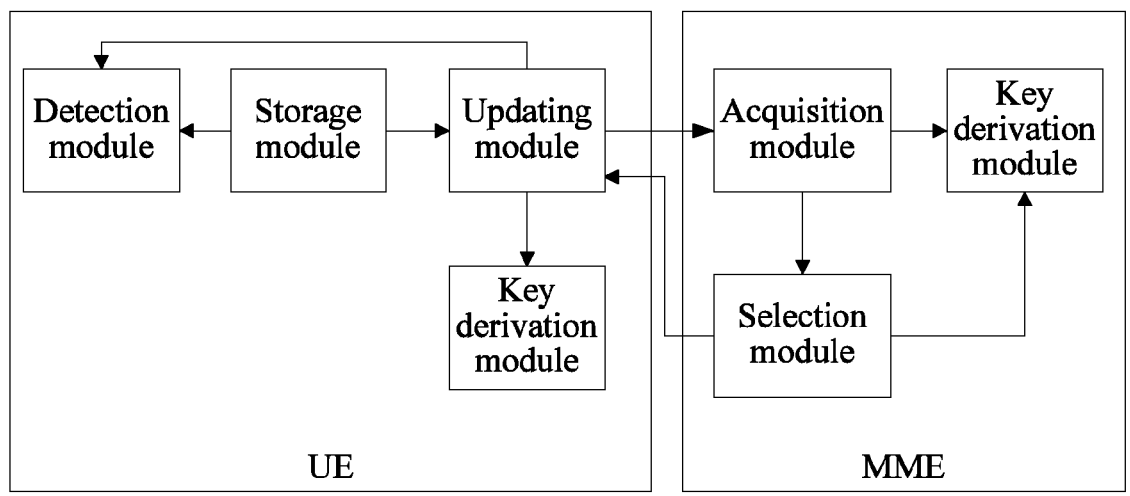
FIG. 4 is a structural view of a system, according to an embodiment of the present disclosure, for negotiating a security capability when a terminal moves.

FIG. 4 is a structural view of a system, according to an embodiment of the present disclosure, for negotiating a security capability when a terminal moves. Referring to FIG. 4, the system includes a UE and an MME.

The UE is adapted to send a TAU request message to the MME, receive a message carrying a selected NAS security algorithm sent from the MME, and derive an NAS protection key according to an authentication vector-related key.

The MME is adapted to: receive the TAU request message sent from the UE; acquire an authentication vector-related key or a root key derived according to the authentication vector-related key, and an NAS security algorithm supported by the UE; select an NAS security algorithm according to the NAS security algorithm supported by the UE, and generate and send a message carrying the selected NAS security algorithm to the UE; and derive an NAS protection key according to the acquired authentication vector-related key or the root key derived according to the authentication vector-related key.

In the system, the MME further acquires security capability information supported by the UE, and further carries the security capability information supported by the UE in the message carrying the selected NAS security algorithm sent to the UE, and the UE further determines whether a degradation attack occurs by determining whether the security capability information supported by the UE and sent from the MME is consistent with security capability information supported by the UE.

Specifically, the MME includes an acquisition module, a selection module, and a key derivation module.

The acquisition module is adapted to receive the TAU request message sent from the UE, acquire the authentication vector-related key or the root key derived according to the authentication vector-related key, and the NAS security algorithm supported by the UE. The selection module is adapted to select the NAS security algorithm according to the NAS security algorithm supported by the UE and acquired by the acquisition module, generate and send the message carrying the selected NAS security algorithm to the UE. The key derivation module is adapted to derive the NAS protection key, according to the authentication vector-related key or the root key derived according to the authentication vector-related key acquired by the acquisition module, and the selected NAS security algorithm.

The acquisition module further acquires the security capability information supported by the UE, and the selection module further carries the security capability information supported by the UE and acquired by the acquisition module in the message carrying the selected NAS security algorithm.

The UE includes an updating module, a key derivation module, a storage module, and a detection module.

The updating module is adapted to send the TAU request message carrying the security capability information supported by the UE and stored in the storage module to the MME, and receive the message carrying the selected NAS security algorithm sent from the MME. The key derivation module is adapted to derive the NAS protection key according to the authentication vector-related key and the selected NAS security algorithm received by the updating module.

The storage module is adapted to store the security capability information supported by the UE. The detection module is adapted to determine that a degradation attack occurs when detecting that the security capability information supported by the UE and received from the MME is inconsistent with the security capability information supported by the UE and stored in the storage module. The message carrying the selected NAS security algorithm sent from the MME further carries security capability information supported by the UE.

It can be seen from the above description that, in the technical solutions provided in embodiments of the present disclosure, the MME receives the TAU request message sent from the UE, and acquires the NAS security algorithm supported by the UE and the authentication vector-related key or the root key derived according to the authentication vector-related key; and then selects the NAS security algorithm according to the NAS security algorithm supported by the UE, and generates and sends the message carrying the selected NAS security algorithm to the UE, thereby enabling the UE and the MME to share the NAS security algorithm. In addition, the UE and the MME derive the NAS protection key according to the authentication vector-related key or the root key derived according to the authentication vector-related key, thereby enabling the MME and the UE to share the NAS protection key. In this way, when moving from the 2G/3G network to the LTE network, the UE can negotiate the NAS security algorithm and the NAS protection key with the MME, so that the security capability negotiation process in the TAU procedure between the heterogeneous networks is achieved, thereby ensuring the security of subsequent interaction between the UE and the network.

Through the present disclosure, the degradation attack can be further prevented. The MME also returns the security capability information supported by the UE through the TAU accept message, and the UE detects whether the security capability information supported by the UE is consistent with the current security capability information supported by the UE. If yes, the current security capability negotiation succeeds, and the NAS security algorithm and the NAS protection key obtained through the negotiation can be used. If not, it is determined that a degradation attack occurs, the current security capability negotiation fails, and the security capability negotiation needs to be performed again. Through the above solutions, it can be detected whether the security capability information supported by the UE is attacked before the MME acquires the security capability information supported by the UE, thereby preventing the degradation attack and ensuring the security of subsequent interaction between the UE and the network.

In one embodiment, the present disclosure is directed to a method for negotiating a security capability when a terminal moves, so that when moving from a 2G/3G network to an LTE network, a UE in an idle state can negotiate a security capability.

In another embodiment, the present disclosure is further directed to a system for negotiating a security capability when a terminal moves, so that when moving from a 2G/3G network to an LTE network, a UE in an idle state can negotiate a security capability.

In yet another embodiment, the present disclosure is further directed to an MME, so that when moving from a 2G/3G network to an LTE network, a UE in an idle state can negotiate a security capability.

In yet another embodiment, the present disclosure is further directed to a UE device, so that when moving from a 2G/3G network to an LTE network, a UE in an idle state can negotiate a security capability.

In yet another embodiment, a method for negotiating a security capability when a terminal moves is provided, which includes the following steps. An MME receives a TAU request message sent from a UE, and acquires an NAS security algorithm supported by the UE, and an authentication vector-related key or a root key derived according to the authentication vector-related key. The MME selects an NAS security algorithm according to the NAS security algorithm supported by the UE, derives an NAS protection key according to the authentication vector-related key or the root key, and sends a message carrying the selected NAS security algorithm to the UE. The UE derives an NAS protection key according to an authentication vector-related key thereof.

In yet another embodiment, a system for negotiating a security capability when a terminal moves is provided, which includes a UE and an MME. The UE is configured to send a TAU request message to the MME, receive a message carrying a selected NAS security algorithm sent from the MME, and derive an NAS protection key according to an authentication vector-related key. The MME is configured to: receive the TAU request message sent from the UE; acquire an authentication vector-related key or a root key derived according to the authentication vector-related key, and an NAS security algorithm supported by the UE; select an NAS security algorithm according to the NAS security algorithm supported by the UE, and generate and send a message carrying the selected NAS security algorithm to the UE; and derive an NAS protection key according to the acquired authentication vector-related key or the root key.

In yet another embodiment, an MME is provided, which includes an acquisition module, a selection module, and a key derivation module. The acquisition module is configured to receive a TAU request message sent from a UE, acquire an authentication vector-related key or a root key derived according to the authentication vector-related key, and an NAS security algorithm supported by the UE. The selection module is configured to select an NAS security algorithm according to the NAS security algorithm supported by the UE and acquired by the acquisition module, generate a message carrying the selected NAS security algorithm, and send the message to the UE. The key derivation module is configured to derive an NAS protection key according to the authentication vector-related key or the root key derived according to the authentication vector-related key acquired by the acquisition module, and the NAS security algorithm selected by the selection module.

In yet another embodiment, a UE is provided, which includes an updating module, a key derivation module, a storage module, and a detection module. The updating module is configured to send to an MME a TAU request message carrying security capability information supported by the UE and stored in the storage module, and receive a message carrying a selected NAS security algorithm sent from the MME. The key derivation module is configured to derive an NAS protection key according to an authentication vector-related key and the NAS security algorithm received by the updating module. The storage module is configured to store the security capability information supported by the UE. The detection module is configured to determine that a degradation attack occurs when detecting that security capability information supported by the UE and received from the MME is inconsistent with the security capability information supported by the UE and stored in the storage module.

In yet another embodiment, the MME receives the TAU request message sent from the UE, and acquires the authentication vector-related key or the root key derived according to the authentication vector-related key and the NAS security algorithm supported by the UE; then selects the NAS security algorithm according to the NAS security algorithm supported by the UE, generates a message carrying the selected NAS security algorithm, and sends the message to the UE, thereby enabling the UE and the MME to share the NAS security algorithm. In addition, the MME derives the NAS protection key according to the authentication vector-related key or the root key derived according to the authentication vector-related key, and the UE derives the NAS protection key according to the authentication vector-related key, thereby enabling the MME and the UE to share the NAS protection key. In this way, when moving from the 2G/3G network to the LTE network, the UE can negotiate the NAS security algorithm and the NAS protection key with the MME, so that the security capability negotiation process in the TAU procedure between heterogeneous networks is achieved, thereby ensuring the security of subsequent interaction between the UE and the network.

In addition, the present disclosure is also applicable to a security capability negotiation procedure when the UE moves within the LTE network.

The above descriptions are merely preferred embodiments of the present disclosure, but not intended to limit the protection scope of the present disclosure. Any modification, equivalent replacement, and improvement made without departing from the spirit and principle of the present disclosure fall within the protection scope of the present disclosure.

What is claimed is:

1. A method of security negotiation for idle state mobility from a first network to a long term evolution (LTE) network, the method comprising:
transmitting an authentication vector-related key from a service general packet radio service (GPRS) support node (SGSN) of the first network to a mobility management entity (MME) included in the LTE network;
receiving, by the MME, security capabilities of a user equipment (UE) including non-access stratum (NAS) security capabilities of the UE from the UE;
selecting, by the MME, a NAS security algorithm supported by the NAS security capabilities of the UE;
sending, by the MME, a message that indicates the selected NAS security algorithm to the UE; and
deriving, by the MME, a NAS protection key with the selected NAS security algorithm from the authentication vector-related key.

2. The method of claim 1, wherein the security capabilities is received through a tracking area update (TAU) request message.

3. The method of claim 1, wherein the message that indicates the selected NAS security algorithm is a NAS security mode command message.

4. The method of claim 1, wherein the message that indicates the selected NAS security algorithm is a tracking area update (TAU) accept message.

5. The method of claim 1, further comprising, before the sending the message that indicates the selected NAS security algorithm:
protecting, by the MME, the message that indicates the selected NAS security algorithm, with the derived NAS protection key.

6. The method of claim 1, wherein the first network is a second generation (2G) network and the authentication vector-related key includes an encryption key (Kc).

7. The method of claim 1, wherein the first network is a third generation (3G) network and the authentication vector-related key includes an integrity key (1K) and an encryption key (CK).

8. The method of claim 1, wherein the authentication vector-related key is transmitted through a context response message.

9. The method of claim 2, wherein the first network is a second generation (2G) network and the authentication vector-related key includes an encryption key (Kc).

10. The method of claim 2, wherein the first network is a third generation (3G) network and the authentication vector-related key includes an integrity key (1K) and an encryption key (CK).

11. The method of claim 2, wherein the message that indicates the selected NAS security algorithm is a NAS security mode command message.

12. The method of claim 11, wherein the transmitting the authentication vector-related key comprises transmitting the authentication vector-related key through a context response message.

13. The method of claim 12, further comprising, before the sending the message that indicates the selected NAS security algorithm:
protecting, by the MME, the message that indicates the selected NAS security algorithm, with the derived NAS protection key.

14. The method of claim 13, wherein the first network is a second generation (2G) network and the authentication vector-related key includes an encryption key (Kc).

15. The method of claim 13, wherein the first network is a third generation (3G) network and the authentication vector-related key includes an integrity key (1K) and an encryption key (CK).

16. A method of security negotiation for idle state mobility from a first network to a long term evolution (LTE) network, the method comprising:
transmitting an authentication vector-related key from a service general packet radio service (GPRS) support node (SGSN) in the first network to a mobility management entity (MME);
receiving, by the MME, security capabilities of a user equipment (UE) including non-access stratum (NAS) security capabilities of the UE from the UE;
selecting, by the MME, a NAS security algorithm supported by the NAS security capabilities of the UE;
sending, by the MME, a message that indicates the selected NAS security algorithm to the UE; and
deriving, by the MME, a NAS protection key with the selected NAS security algorithm from the authentication vector-related key.

17. The method of claim 16, wherein the security capabilities is received through a tracking area update (TAU) request message.

18. The method of claim 16, wherein the message that indicates the selected NAS security algorithm is a NAS security mode command message.

19. The method of claim 17, wherein the first network is a second generation (2G) network and the authentication vector-related key includes an encryption key (Kc).

20. The method of claim 17, wherein the first network is a third generation (3G) network and the authentication vector-related key includes an integrity key (1K) and an encryption key (CK).

* * * * *